United States Patent
Egger

(10) Patent No.: US 7,032,737 B2
(45) Date of Patent: Apr. 25, 2006

(54) CONVEYING APPARATUS FOR OPEN CONTAINERS

(75) Inventor: Walter C. Egger, Weggis (CH)

(73) Assignee: VT Zurich Marketing PTE, Ltd., Singapore (SG)

( * ) Notice: Subject to any disclaimer, the term of this patent is extended or adjusted under 35 U.S.C. 154(b) by 73 days.

(21) Appl. No.: 10/235,204

(22) Filed: Sep. 5, 2002

(65) Prior Publication Data

US 2003/0051977 A1   Mar. 20, 2003

(30) Foreign Application Priority Data

Sep. 6, 2001   (CH) ..................................... 1654/01

(51) Int. Cl.
*B65G 15/00*   (2006.01)
*B08B 3/00*   (2006.01)

(52) U.S. Cl. .................... 198/405; 198/626.6; 198/697; 198/699; 134/68; 134/70; 134/127; 134/132

(58) Field of Classification Search ............... 198/405, 198/626.5, 626.6, 690.2, 697–699; 134/22.18, 134/23, 68, 70, 72, 127, 132
See application file for complete search history.

(56) References Cited

U.S. PATENT DOCUMENTS 3,767,028 A * 10/1973 Rosso ........................ 198/405
4,064,987 A * 12/1977 Rowan ........................ 198/604
4,479,574 A    10/1984 Julius et al.
4,798,281 A *  1/1989 Egger ........................ 198/698
4,861,166 A *  8/1989 Kuwabara .................. 198/405
5,000,311 A *  3/1991 Abbestam et al. ....... 198/690.2
5,029,696 A *  7/1991 Van Tilburg ............. 198/626.1
5,219,065 A *  6/1993 Hodlewsky et al. ........ 198/853
5,363,866 A    11/1994 Egger
5,492,216 A *  2/1996 McCoy et al. ........... 198/626.5

FOREIGN PATENT DOCUMENTS

EP    0 576 398    6/1993
GB    1 203 977    9/1970

* cited by examiner

Primary Examiner—Douglas Hess
(74) Attorney, Agent, or Firm—Maginot, Moore & Beck

(57) ABSTRACT

A conveying apparatus for transporting open containers is provided with at least two conveying elements located opposite to each other that are adapted frictionally or positively engage the containers. Each conveying element comprises a plurality of gripping elements by means of guiding rails. The gripping elements each comprise at least two lip members located distantly to each other as seen in conveying direction and elastically resilient at least in a direction crosswise to the conveying direction, in order to grasp the containers laterally. The gripping elements are adapted to grasp and guide the containers, such that additional guiding elements can be avoided.

21 Claims, 4 Drawing Sheets

CONVEYING APPARATUS FOR OPEN CONTAINERS

BACKGROUND OF THE INVENTION

The present invention refers to an apparatus for moving open containers along a predetermined path in a conveying direction, particularly to a conveying apparatus for moving beverage bottles through a processing station, particularly through a cleaning station.

Such a conveying apparatus may be used, for example, to transport open containers like bottles, cans or tumblers to a processing station and thereafter to a filling station. Usually, prior to filling the containers with the desired content, they have to be processed in some way. The expression "process" shall be understood, in the present context, particularly as draining, cleaning, heating or sterilizing the container, whereby, again in the present context, reference is made particularly to containers used in the food, beverage, chemical and pharmaceutical industry. Usually, the containers, fed to the processing station by a conveying apparatus in an upright position, have to be rotated into a processing position in which the opening of the container points downwards. Thereby, for example a cleaning fluid directed into the interior of the containers for the purpose of their cleaning can flow out under the influence of gravity. Thereafter, i.e. after having been cleaned and drained, the containers have to be rotated back into their initial, upright position, in which they can be subsequently filled.

PRIOR ART

The document EP 0 576 398 discloses an apparatus for cleaning open containers. This apparatus comprises a drag chain conveyor by means of which the containers are moved along a cleaning apparatus. The drag chain conveyor comprises two endless looping conveying chains, moving parallel along the conveying path in the same direction and having a certain distance from each other. The conveying path of the drag chain conveyor extends in the form of a vertical loop from the input area in a first arc section upwards, then along a straight section in a direction opposite to the movement in the input area, and finally in a second arc section downwards to an output area. The arc sections are laterally offset to each other such that the straight section extends inclined between the first and the second arc section. Along the straight section, in which the containers are conveyed with their opening pointing downwards, the cleaning apparatus is located. It comprises catch dogs activated by the containers which compellingly align a jet nozzle provided for cleaning the interior of the containers to the opening of the related container. The feeding and discharging of the containers is performed by means of belt conveyors on which the containers are transported in an upright position.

Even if such an apparatus has proven advantageous and reliable in practice for cleaning open containers, it would be desirable to reduce the space requirements for the conveying apparatus and to be able to use only one kind of conveyors, avoiding the need to pass the containers from a belt conveyor to a drag chain conveyor and vice versa.

U.S. Pat. No. 4,479,574 discloses an apparatus for transporting containers, comprising an input area, an intermediate area for processing the containers and an output area. For guiding the containers, a guiding cage is provided, consisting of a plurality of guiding rods and having an inner shape that matches the outer shape of the containers to be transported. For transporting the containers, belts are provided on each side of the guiding cage, engaging the container and carrying them along. The guiding cage is designed such that the containers are rotated in the input area around a central longitudinal axis extending in conveying direction by 180° into the processing position, and in the output area by a further 180°, resulting in their original upright position. A disadvantage of such an apparatus may be seen in the fact that only one size and shape of containers can be transported with that kind of apparatus because the shape of the guiding cage has to be adapted to the shape and size of the container. Moreover, there is a danger that the containers jam in the guiding cage.

OBJECTS OF THE INVENTION

Thus, it is an object of the invention to provide a conveying apparatus for moving open containers along a predetermined path that is of simple design, needs only modest space and can be used universally.

SUMMARY OF THE INVENTION

To meet these and other objects, the invention provides, according to a first aspect, a conveying apparatus for moving open containers along a predetermined path in a conveying direction. The apparatus comprises a first elongate conveying element extending along the predetermined path on one side thereof and a second elongate conveying element extending along the predetermined path along another side thereof opposite to the aforementioned one side. The first and second conveying elements comprise means for grasping the containers to be moved along the predetermined path, whereby each of the first and second conveying elements comprise a plurality of gripping elements.

Both the first and second conveying elements comprise guiding rails engaging the gripping elements to guide the gripping elements for moving along the guiding rails in the conveying direction.

Each gripping element comprises at least two lip members having a mutual distance as seen in the conveying direction and being elastically resilient at least in a direction running crosswise to the conveying direction, and each gripping element of the first conveying element and an oppositely located gripping element of the second conveying element constitutes a gripping member pair adapted to convey and guide one of the containers along the predetermined path in the conveying direction.

According to a second aspect of the invention, there is provided a conveying apparatus for moving open containers along a predetermined path in a conveying direction, whereby the predetermined path has an input section, an output section and a processing section located between the input section and the output section. A first elongate conveying element extends along the predetermined path on one side thereof and a second elongate conveying element extends along the predetermined path along another side thereof opposite to the one side, whereby the first and second conveying elements comprise means for grasping the containers to be moved along the predetermined path. Each of the first and second conveying elements comprises a plurality of gripping elements adapted to engage the containers.

Each of the first and second conveying elements comprises guiding rails engaging the plurality of gripping elements to guide the gripping elements for moving along the guiding rails in the conveying direction, whereby the guiding rails have a helical configuration along the input section and/or along the output section, thereby guiding the gripping elements as to rotate the container engaged by the gripping elements around a central longitudinal axis extending in the conveying direction from an initial upright position into a processing position, and from a processing position into an upright filling position, respectively.

Each gripping element comprises at least two lip members having a mutual distance as seen in the conveying direction and being elastically resilient at least in a direction running crosswise to the conveying direction, and each gripping element of the first conveying element and an oppositely located gripping element of the second conveying element constitutes a gripping member pair adapted to convey and guide one of the containers along the predetermined path in the conveying direction.

Such a conveying apparatus having the characteristics of the invention may be used for various applications. Due to the fact that the gripping elements are guided by means of guiding rails, and not the related conveying elements, a predetermined orientation and position of the containers to be transported can be kept very accurately, with the result that additional guiding means, e.g. required in the apparatus according to U.S. Pat. No. 4,479,574, can be avoided. Moreover, the gripping elements according to the invention are suitable to be used with a variety of containers having different shapes and diameters.

Due to the fact that the distance between facing lips members of adjacent gripping elements essentially corresponds to the distance between two lip members of an individual gripping element, a conveying apparatus is established comprising essentially an endless row of adjacent gripping elements and lip members, respectively. Thereby, it does not make any difference whether the container to be transported is engaged by the two lip members of an individual gripping element or by the lip members of two adjacent gripping elements. In other words, the containers do not have to be fed to the conveying apparatus according to the distance of the gripping elements, but they can be fed thereto independently of the actual position of the gripping elements and in any arbitrary distance to each other.

BRIEF DESCRIPTION OF THE DRAWINGS

In the following, an embodiment of the apparatus according to the invention will be further described, with reference to the accompanying drawings, in which.

DETAILED DESCRIPTION OF A PREFERRED EMBODIMENT

Figure 1:
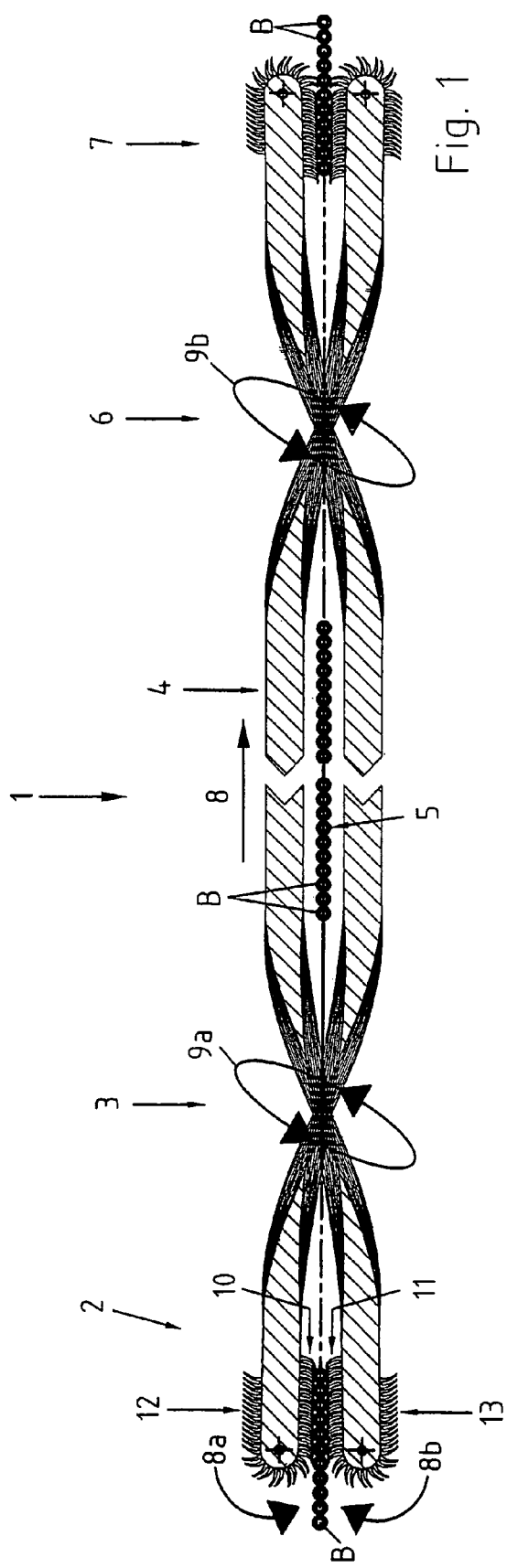
FIG. 1 shows a top view of a schematically illustrated conveying apparatus.

The illustration according to FIG. 1 shows a top view of a schematically illustrated conveying apparatus. In the present case, the conveying apparatus, generally designated by reference numeral 1, serves for feeding containers B that are open at one end to a processing station 5 and for removing the containers B from the processing station 5. The processing station 5 can be, for example, a cleaning station in which the interior of the open containers is cleaned e.g. by rinsing it. Such cleaning devices are known for example as bottle rinsers.

The conveying apparatus 1 comprises two conveying devices 10 and 11 which are located in a certain distance from each other and both are in the form of an endless loop. The conveying devices 10, 11 comprise a plurality of gripping elements 12, 13 adapted to laterally grasp and convey the containers. The two conveying devices 10, 11 are driven by suitable, not shown driving means and synchronized to each other.

The conveying apparatus 1 comprises an input area 2, an output area 7 and a processing area 4 located between the input area 2 and the output area 7. Moreover, there are provided a feeding conveyor located operationally in front of the input area 2 of the conveying apparatus as well as a discharge conveyor located operationally behind the output area 7 of the conveying apparatus 1. These additional conveyors are of conventional design and well known to any person skilled in the art; thus they are not shown in the drawings nor further described.

At the inlet of the conveying apparatus 1, i.e. when the containers B arrive at the input area 2, the containers B are in an upright initial position, having their opening at the top. On the other side, the processing station 5 comprises a processing station 5 with a plurality of nozzles (not shown) for blowing out or rinsing the containers B. Since the nozzles are directed upwards, the containers B have to be rotated by 180° such that their opening is directed downwards. The general conveying direction of the conveying apparatus 1 is symbolized by an arrow 8, and the sense of rotation of the two conveying devices 10, 11 at the beginning of the input area 2 is indicated by the arrows 8a and 8b. The input area 2 comprises a helix shaped portion 3 in which the containers B are rotated by 180°, around a central longitudinal axis running along the conveying direction 8, from their initial upright position into a reversed position. Such rotation is indicated by the arrows 9a. After that rotation, the openings of the containers B are directed vertically downwards.

The processing area 4 following the input area 2 is shown in FIG. 1 only partially. In fact, the processing area 4 extends over several meters following the processing station 5, with the result that the containers B rinsed along the processing station 5 by means of a fluid medium can drip off when they are conveyed along the following linearly extending section of the conveying path. The output area 7 also comprises, at its beginning, a helix shaped portion 6 in which the containers B are rotated by 180° around an axis extending along the conveying direction 8 from their drip off position back to an upright filling position, as indicated by the arrows 9b. In the case of the containers B located in the output area 7, the opening of the containers B is directed upwards again. In this position, the containers B can be fed to a subsequent filling station which, however, is not shown in the drawings. It is understood that the direction of rotation must not be identical in the input area 2 and the output area 7.

The gripping elements 12, 13 of the related conveying device 10, 11 are connected to each other by means of a chain and form, together, as so-called drag chain conveyor. For guiding the gripping elements 12, 13, guiding rails are provided which, however, are not shown in FIGS. 1 and 2. The guiding rails guide the gripping elements 12, 13 along a predetermined path. At the end of the input area 2 and at the beginning of the output area 7, the guiding rails follow a helix shaped path in order to force the gripping elements 12, 13 to perform a corresponding motion. Specifically, at the end of the input area 2, the helix shaped design of the guiding rails forces the gripping elements 12, 13 to perform a rotational movement by 180° around a longitudinal axis running along the conveying path 8, resulting in a corresponding 180° rotational movement of the conveyed containers B held by the gripping elements 12, 13. By guiding the gripping elements 12, 13 by means of guiding rails, it is ensured that the mutual distance between opposite gripping elements remains constant, also during the rotational movement; moreover, the front faces of opposite gripping elements 12, 13 always run parallel to each other, with the result that any relative movement between the containers B and the gripping elements 12, 13 is avoided. Thus, it is not necessary to provide additional guiding means whatsoever.

Figure 2:
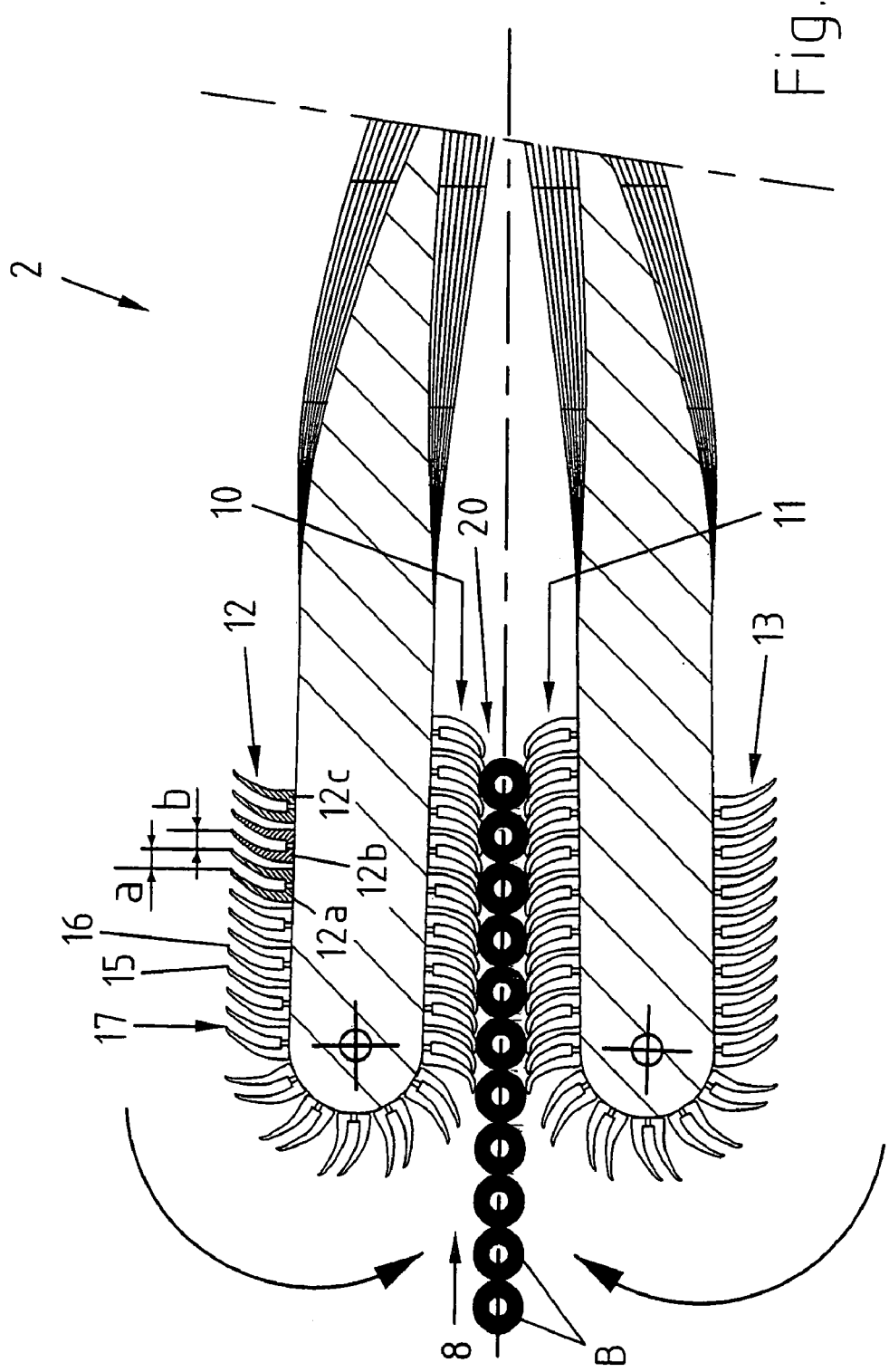
FIG. 2 shows an enlarged top view of the input area of the conveying apparatus according to FIG. 1.

As can be seen in the enlarged illustration of the input area 2 according to FIG. 2, each gripping element 12 comprises two lips 15, 16, having a certain mutual distance as seen in the direction of conveying, and having front faces running parallel to each other. The front faces 17 of the lips 15, 16 are essentially line shaped, resulting in a line contact between the lips 15, 16 and the container B to be conveyed. The longitudinal axis of the lips 15, 16 runs essentially crosswise to the conveying direction. It is understood that, instead of two lips 15, 16, three or more lips can be provided on each gripping element 12a, 12b, 12c.

The individual gripping elements 12a, 12b, 12c have a mutual distance such that the distance b between facing lips of adjacent gripping elements 12a, 12b essentially corresponds to the distance a between two lips of an individual gripping element 12a. For clarity's sake, reference was made herein before to the outer gripping elements 12a, 12b, 12c. However, it is understood that the situation relating to the mutual distance b between facing lips of adjacent gripping elements and to the distance a between the two lips of an individual gripping element is identical at the inner side 20 of the two conveying devices running opposite to each other in the region of the containers B to be transported. In this way, conveying devices are realized which are provided, in effect, with an endless row of gripping elements 12, 13 and lips 15, 16, respectively.

The lips 15, 16 of the gripping elements 12, 13 are bent backwards, opposite to the conveying direction 8, in such a way that they are elastically resilient both crosswise to the conveying direction 8 and opposite to the conveying direction 8. The distance between the front faces of the lips of opposite gripping elements 12, 13 corresponds at most to twice the length of a lip, measured crosswise to the conveying direction 8, as will be further explained herein after with reference to FIG. 3. The result is that containers B having different diameters can be safely grasped and conveyed. In practice, for example containers having a diameter between 40 mm and 110 mm can be used in a conveying apparatus according to the invention. Additionally, the lips 15, 16 are designed such that the force required for elastically deforming the lips 15, 16 is essentially independent of the magnitude of the deflection or deformation of the lips 15, 16. Amongst else, this is important in transporting containers made of plastic material having a small wall thickness, e.g. PET bottles, in order to avoid, particularly in the case of containers having a large diameter, a deformation of the containers and their walls, respectively, by the lips 15, 16.

Figure 3:
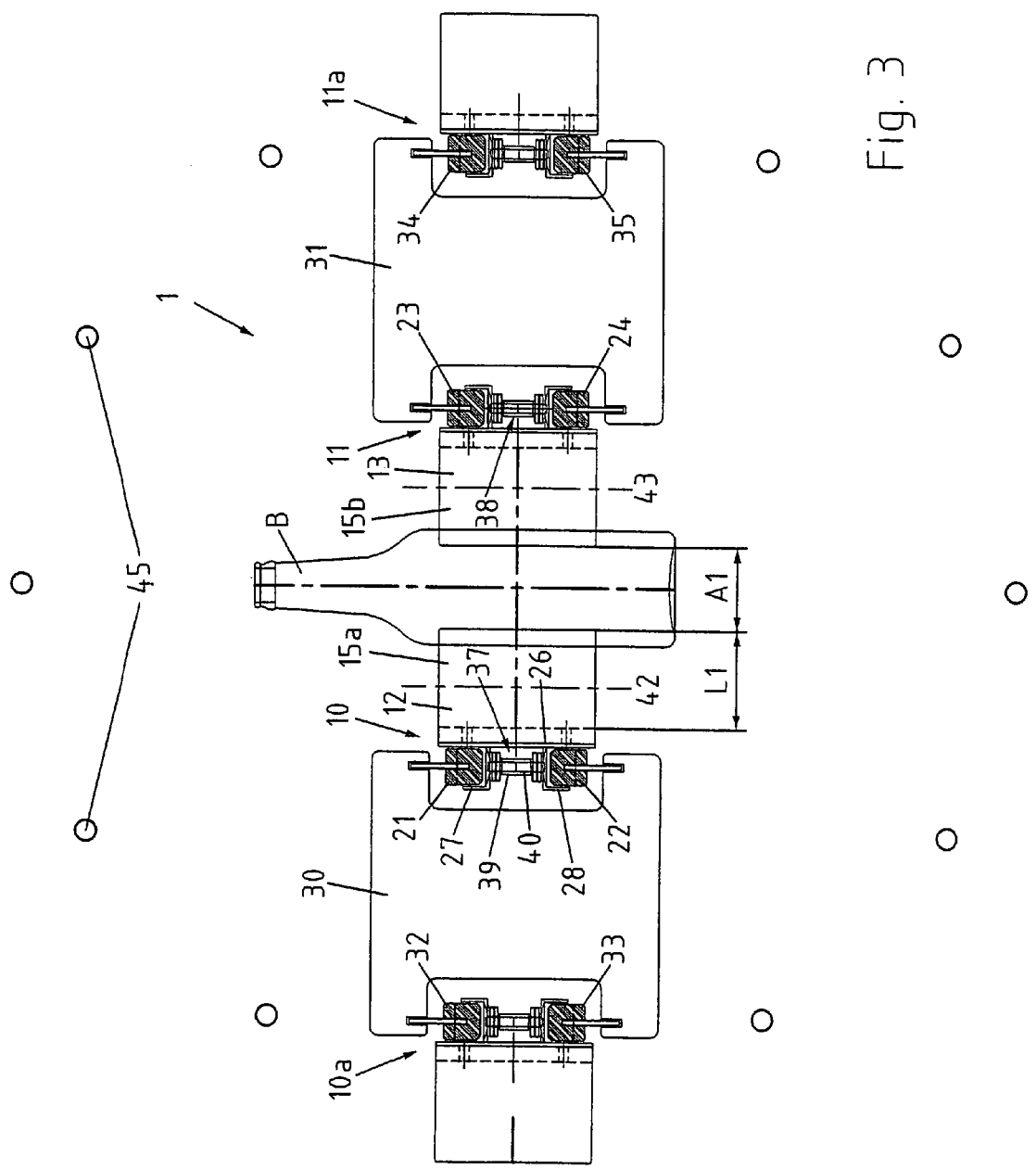
FIG. 3 shows a cross sectional view of the conveying apparatus.

FIG. 3 shows a cross sectional view of the conveying apparatus 1 along a straight extending section thereof. This illustration clearly exhibits the two conveying devices 10, 11, provided with a plurality of gripping elements 12, 13. For guiding the gripping elements 12, 13, guiding rails 21, 22, 23 and 24 are provided. These guiding rails 21, 22, 23 and 24 are fixed to disc shaped support elements 30, 31, a plurality of which are located in certain distances from each other, interconnected by bracings 45 symbolically shown in FIG. 3. At the outer side of each support element 30, 31, further guiding rails 32, 33, 34 and 35 are provided which serve for guiding the outer strands 10a, 11a of the related conveying device 10, 11.

The gripping elements 12, 13 in each case comprise a base body member 26 provided with two L-shaped supporting arm members 27, 28, each partially enclosing a guiding rail 21, 22. For dragging the gripping elements 12, 13 in conveying direction, each conveying device 10, 11 comprises a drag chain 37, 38 to which the base body members 26 are frictionally connected. The individual members of the particular drag chain 37 and 38, respectively, are interconnected by means of bolts 40 guided in sleeves 39. In order to enable the drag chain 37, 38 to be rotated in longitudinal direction, i.e. in conveying direction, there is a certain clearance between the bolts 40 and the sleeves 39.

FIG. 3 clearly illustrates that no further guiding means are provided for guiding the containers B, e.g. bottles, but that the guiding and conveying of the containers B is performed exclusively by means of the gripping elements 12, 13. The lips 15a, 15b of the gripping elements 12, 13 are made of an elastic material, adjusted to the material of the containers B to be conveyed such that a high frictional force is developed between the particular gripping elements 12, 13 and the container B to be conveyed. Thus, no relative movement between the lips of the gripping elements 12, 13 and the related container B occurs during the transport of the containers.

As already mentioned, the distance A1 between the end of the lips of opposite gripping elements 12, 13 corresponds at most to twice the length L1 of a lip 15a, as measured crosswise to the conveying direction. In practice, the length L1 of the related lip 15a is some millimeters more than the distance A1 between the end of the lips of opposite gripping elements 12, 13. The longitudinal axis of the lip of the left gripping element 12 is designated with reference numeral 42, while the longitudinal axis of the lip of the right gripping element 13 is designated with reference numeral 43.

Instead of a conventional drag chain conveyor, for example also a conveying device can be provided that comprises a plurality of pushed or pulled gripping elements. In this case, as well, the gripping elements are arranged along an endless path. Such gripping elements could be driven by means of endless running rope element which is provided with carrier dogs frictionally or positively engaging the gripping elements. Such a design would have the advantage that it can be easily helically deflected to an input area 2 and an output area 7 (cf. FIG. 1). But also a mechanical coupling of the gripping elements is possible, for example if the gripping elements are not directly connected to each other, but by a design in which one gripping element pushes another one located in front of it.

Figure 4:
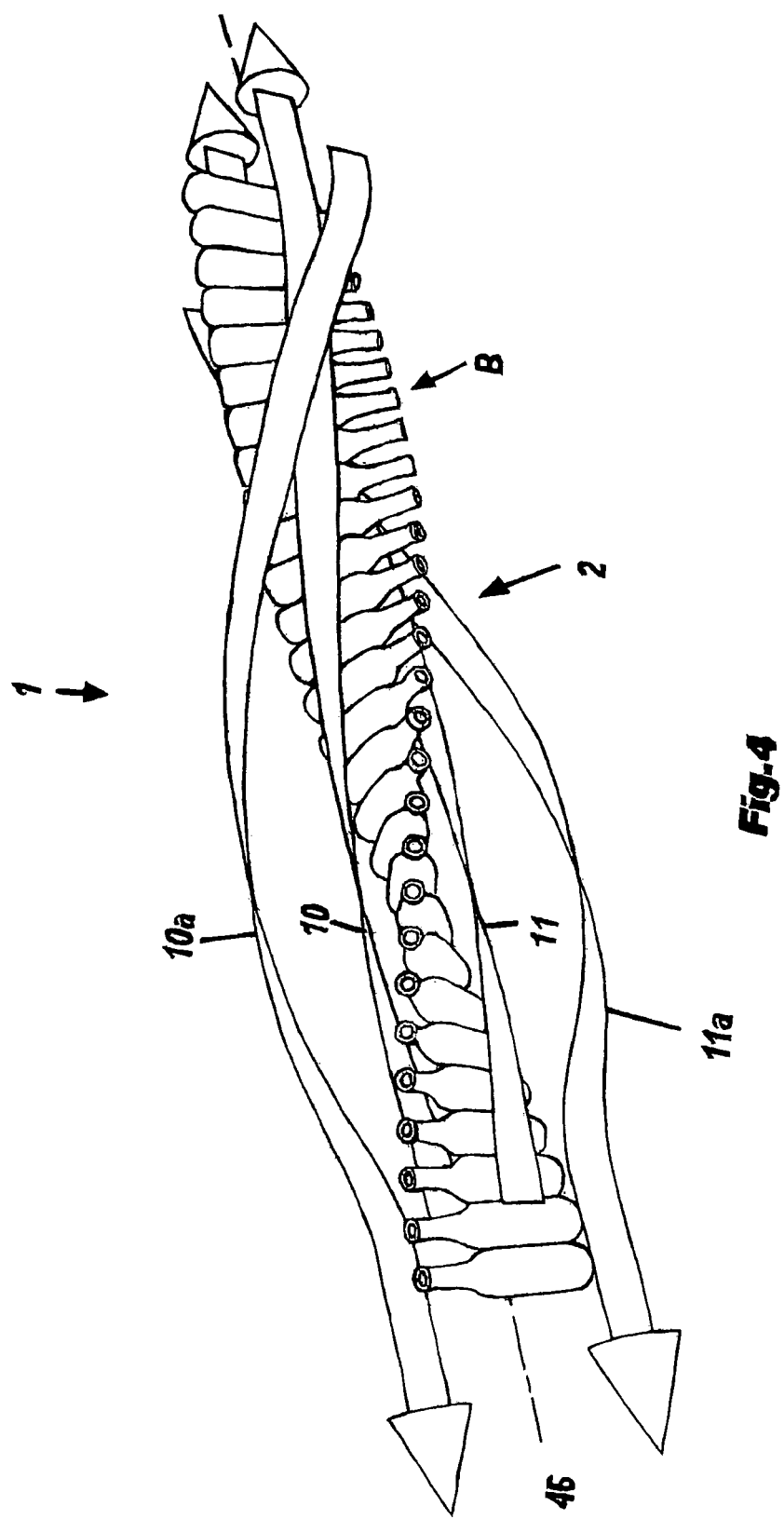
FIG. 4 shows a schematic view of the input area of the conveying apparatus.

Finally, FIG. 4 schematically shows the end of the input area 2. This illustration clearly exhibits that the containers B are rotated along the input area by 180° around the central longitudinal axis 46 of the conveying apparatus 1. The conveying devices 10, 11 and 10a, 11a, respectively, are but symbolically shown in this drawing. It is to be noted that the pivot of the related container B always remains exactly on the central longitudinal axis 46 of the conveying apparatus 1.

It is understood that the embodiment described herein before has only exemplary character and cannot be considered as final. For example, instead of or additionally to the cleaning station 5, a processing area designed as a draining station can be provided in which any fluid possibly present in the containers can flow out under the influence of gravity. Equally, instead of a processing area designed as a cleaning station, a sterilization station, a heating station or a collecting station for collecting the content of containers that are to be emptied could be provided.

Instead of the conveying apparatus 1 shown in the drawings and described herein before which extends in a horizontal plane, the conveying apparatus or particular sections thereof could be designed to run in an inclined or in vertical direction to bridge level differences. The space requirements of the input area and the output area as shown in the drawings and as described herein before is very modest, as compared to the space requirements of conventional input and output areas. Moreover, the input and output areas are of relatively simple design and can be manufactured at low costs.

It is understood that the containers B do not have to be rotated compellingly by 180°, but that under certain circumstances also a rotation by 150° or similar could be sufficient in order to bring the opening of the container downwards to enable the container to be fully and compellingly drained. Thus, preferably, the container is rotated along the input area by 150° to 210° and rotated back in the output area again by 150° to 210° into a filling position, i.e. into an upright position with the opening at the top.

What is claimed is:

1. A conveying apparatus for moving open containers along a predetermined path in a conveying direction, comprising:
   a first elongate conveying means extending along said predetermined path on one side thereof and a second elongate conveying means extending along said predetermined path along another side thereof opposite to said one side, said first and second conveying means comprising means for grasping said containers to be moved along said predetermined path;
   each of said first and second conveying means comprising a plurality of gripping element means;
   each of said first and second conveying means comprising at least one guiding rail means, said at least one guiding rail means engaging said plurality of gripping element means to guide said gripping element means for moving along said guiding rail means in said conveying direction;
   each gripping element means of said plurality of gripping element means comprising at least two lip means having a mutual distance as seen in said conveying direction and are bent backwards opposite to said conveying direction to be elastically resilient both in a direction running crosswise to said conveying direction and in a direction opposite to said conveying direction; and
   each one of said gripping element means of said plurality of gripping element means of said first conveying means and an oppositely located gripping element means of said plurality of gripping element means of said second conveying means constituting a gripping means pair adapted to convey and guide one of said containers along said predetermined path in said conveying directions,
   wherein the distance between facing lips means of adjacent gripping element means essentially corresponds to the distance between two lip means of an individual gripping element means along said predetermined path.

2. A conveying apparatus according to claim 1 in which the conveying and guiding of the containers is performed exclusively by means of said gripping means pairs.

3. A conveying apparatus according to claim 1 in which said lip means have a central longitudinal axis running essentially perpendicular to said conveying direction.

4. A conveying apparatus according to claim 1 in which said lip means are designed such that the force required for elastically deflecting said lip means is essentially independent of the magnitude of the deflection.

5. A conveying apparatus according to claim 1, further comprising means for dragging or pushing said gripping element means along said predetermined path in said conveying direction.

6. A conveying apparatus according to claim 5 in which said means for dragging or pushing said gripping element means along said predetermined path in said conveying direction is constituted by a drag chain means to which said gripping element means are positively fixed.

7. A conveying apparatus according to claim 6 in which the individual members of said drag chain means are interconnected by means of bolt means guided in sleeve means, said bolt means being received in said sleeve means with such an amount of clearance as to enable said drag chain means to be rotated around its longitudinal axis when running through said input section and/or said output section.

8. A conveying apparatus according to claim 7 in which said drag chain means is in the shape of an endless running loop.

9. A conveying apparatus according to claim 6 in which said drag chain means is in the shape of an endless running loop.

10. A conveying apparatus for moving open containers along a predetermined path in a conveying direction, comprising:
    a first elongate conveying means extending along said predetermined path on one side thereof and a second elongate conveying means extending along said predetermined path along another side thereof opposite to said one side, said first and second conveying means comprising means for grasping said containers to be moved along said predetermined path;
    each of said first and second conveying means comprising a plurality of gripping element means;
    each of said first and second conveying means comprising at least one guiding rail means, said at least one guiding rail means engaging said plurality of gripping element means to guide said gripping element means for moving along said guiding rail means in said conveying direction;
    each gripping element means of said plurality of gripping element means comprising at least two lip means having essentially line shaped front face means and a mutual distance as seen in said conveying direction, the front face means of the two lip means of one gripping element means running parallel to each other, in which said lip means of said gripping element means are inclined backwards opposite to said conveying direction to be elastically resilient both crosswise to said conveying direction and opposite to said conveying direction; and
    each one of said gripping element means of said plurality of gripping element means of said first conveying means and an oppositely located gripping element means of said plurality of gripping element means of said second conveying means constituting a gripping means pair adapted to convey and guide one of said containers along said predetermined path in said conveying direction, wherein the distance between facing lips means of adjacent gripping element means essentially corresponds to the distance between two lip means of an individual gripping element means along said predetermined path.

11. A conveying apparatus according to claim 10 in which the distance between said front faces of said lip means of opposite gripping element means of a gripping means pair corresponds at most to twice the length of a lip means, as seen crosswise to said conveying direction.

12. A conveying apparatus according to claim 10 in which said lip means are designed such that the force required for elastically deflecting said lip means is essentially independent of the magnitude of the deflection.

13. A conveying apparatus for moving open containers along a predetermined path in a conveying direction, said predetermined path having an input section, an output section and a processing section located between said input section and said output section, said apparatus comprising:
a first elongate conveying means extending along said predetermined path on one side thereof and a second elongate conveying means extending along said predetermined path along another side thereof opposite to said one side, said first and second conveying means comprising means for grasping said containers to be moved along said predetermined path;
each of said first and second conveying means comprising a plurality of gripping element means adapted to engage said containers;
each of said first and second conveying means comprising at least one guiding rail means, said at least one guiding rail means engaging said plurality of gripping element means to guide said gripping element means for moving along said guiding rail means in said conveying direction;
said at least one guiding rail means having a helical configuration along said input section or along said output section, thereby guiding said gripping element means as to rotate said container engaged by said gripping element means around a central longitudinal axis extending in said conveying direction from either an initial upright position into a processing position, or from a processing position into an upright filling position, respectively;
each gripping element means of said plurality of gripping element means comprising at least two lip means having a mutual distance as seen in said conveying direction and being elastically resilient at least in a direction running crosswise to said conveying direction; and
each one of said gripping element means of said plurality of gripping element means of said first conveying means and an oppositely located gripping element means of said plurality of gripping element means of said second conveying means constituting a gripping means pair adapted to convey and guide one of said containers along said predetermined path in said conveying direction,
wherein the distance between facing lips means of adjacent gripping element means essentially corresponds to the distance between two lip means of an individual gripping element means along said predetermined path.

14. A conveying apparatus according to claim 13 in which both said input section and said output section comprise a guiding rail means having a helical configuration.

15. A conveying apparatus according to claim 13 in which said input section and/or said processing section and/or said output section is/are inclined to bridge height differences.

16. A conveying apparatus according to claim 13 in which said containers are rotated in said input section to such a degree that their opening is directed downwards.

17. A conveying apparatus according to claim 13 in which said containers are rotated in said input section by 150° to 210° and rotated back in said output section by the same angular amount into a filling position.

18. A conveying apparatus according to claim 13 in which said processing section is constituted by a dripping section in which a fluid contained in said containers flows out of the containers under the influence of gravity.

19. A conveying apparatus according to claim 13 in which said input section comprises a guiding rail means having a helical configuration such as to rotate said containers from an upright initial position by 150° to 180° into a dripping position, and in which said output section comprises a guiding rail means having a helical configuration such as to rotate said containers from said dripping position by the same angular amount back into said initial upright position.

20. A conveying apparatus according to claim 13 further comprising:
means for dragging or pushing said gripping element means along said predetermined path in said conveying direction is constituted by a drag chain means to which said gripping element means are positively fixed.

21. A conveying apparatus for moving beverage bottles through a processing station, particularly through a cleaning station, along a predetermined path, comprising:
a first elongate conveying means extending along said predetermined path on one side thereof and a second elongate conveying means extending along said predetermined path along another side thereof opposite to said one side, said first and second conveying means comprising means for grasping said containers to be moved along said predetermined path;
each of said first and second conveying means comprising a plurality of gripping element means;
each of said first and second conveying means comprising at least one guiding rail means, said at least one guiding rail means engaging said plurality of gripping element means to guide said gripping element means for moving along said guiding rail means in said conveying direction;
each gripping element means of said plurality of gripping element means comprising at least two lip means having a mutual distance as seen in said conveying direction and being elastically resilient at least in a direction running crosswise to said conveying direction and positively fixed to a drag chain means; and
each one of said gripping element means of said plurality of gripping element means of said first conveying means and an oppositely located gripping element means of said plurality of gripping element means of said second conveying means constituting a gripping means pair adapted to convey and guide one of said containers along said predetermined path in said conveying direction,
wherein the distance between facing lips means of adjacent gripping element means essentially corresponds to the distance between two lip means of an individual gripping element means alone said predetermined path.

* * * * *